(12) United States Patent
Togashi et al.

(10) Patent No.: US 6,965,507 B2
(45) Date of Patent: Nov. 15, 2005

(54) MULTILAYER CAPACITOR

(75) Inventors: Masaaki Togashi, Akita-ken (JP); Shinya Onodera, Akita-ken (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/775,250

(22) Filed: Feb. 11, 2004

(65) Prior Publication Data

US 2004/0184202 A1    Sep. 23, 2004

(30) Foreign Application Priority Data

Feb. 18, 2003 (JP) .............................. 2003-039279

(51) Int. Cl.[7] ....................... H01G 4/005; H01G 4/228; H01G 4/20
(52) U.S. Cl. ..................... 361/303; 361/306.3; 361/312
(58) Field of Search ............................... 361/303–304, 361/301.4, 311–313, 306.1, 306.3, 308.1, 361/309

(56) References Cited

U.S. PATENT DOCUMENTS

| | | | |
|---|---|---|---|
| 4,814,940 A * | 3/1989 | Horstmann et al. | ......... 361/309 |
| 5,450,278 A * | 9/1995 | Lee et al. | .................... 361/303 |
| 6,661,640 B2 * | 12/2003 | Togashi | ................... 361/306.3 |
| 6,765,781 B2 * | 7/2004 | Togashi | ................... 361/306.3 |
| 6,768,630 B2 * | 7/2004 | Togashi | ................... 361/306.1 |

FOREIGN PATENT DOCUMENTS

| | | | |
|---|---|---|---|
| JP | A 6-140283 | 5/1994 | |
| JP | 8-97070 | * 4/1996 | ............ H01G 4/12 |
| JP | A 11-144996 | 5/1999 | |
| JP | A 2000-323354 | 11/2000 | |
| JP | A 2002-151349 | 5/2002 | |
| JP | A 2002-164256 | 6/2002 | |

* cited by examiner

Primary Examiner—Eric W. Thomas
(74) Attorney, Agent, or Firm—Oliff & Berridge, PLC

(57) ABSTRACT

A dielectric body 12 has internal conductor layers 14 arranged in it. At the far sides of the internal conductor layers 14 separated by ceramic layers 12A, internal conductor layers 16 are arranged. A length W of a side of the dielectric body 12 running along a stacking direction Y of the ceramic layers is made longer than the lengths L and T of any other two sides running along directions (X- and Y-directions) intersecting the side running along the stacking direction (Y-direction). The internal conductor layers 14 and 16 are formed with cut parts 18a and 18b, the internal conductor layers 14 are divided into channel parts 20A and 20B across the cut part 18a, and the internal conductor layers 16 are divided into channel parts 22A and 22B across the cut part 18b. These channel parts are connected through uncut ends 19, whereby the current flows in reverse directions. It is therefore possible to greatly reduce the effective inductance of the multilayer capacitor and reduce the voltage fluctuations of the CPU power source.

31 Claims, 17 Drawing Sheets

CURRENT DIRECTION

CURRENT DIRECTION

I : DRIVE CURRENT OF CPU
Ic : DISCHARGE CURRENT FROM CAPACITOR
Iv : CURRENT FROM POWER SOURCE
C : ELECTROSTATIC CAPACITY
ESR : EQUIVALENT SERIAL RESISTANCE
ESL : EQUIVALENT SERIAL INDUCTANCE

CURRENT DIRECTION

CURRENT DIRECTION

MULTILAYER CAPACITOR

TECHNICAL FIELD

The present invention relates to a multilayer capacitor capable of greatly reducing the effective inductance, more particularly relates to a multilayer ceramic capacitor capable of reducing the voltage fluctuations of a CPU power source.

BACKGROUND ART

In recent years, CPUs (central processing units) used for data processing apparatuses have become higher in operating frequency and remarkably increased in current consumption due to the improvement in processing speeds and higher integration. Along with this, there is a trend toward reduction of the power consumption so as to reduce the operating voltage. Therefore, in power sources for supplying power to CPUs, faster and larger current fluctuations occur. It has become extremely difficult to keep voltage fluctuations accompanying current fluctuations to within tolerances of the power sources.

Therefore, as shown in FIG. 12, a multilayer capacitor 100 called a "decoupling capacitor" is connected to a power source 102 and frequently used for stabilization of the power source. Further, by fast charging and discharging at the time of high speed, transient fluctuations in current, the multilayer capacitor 100 supplies current to the CPU 104 and suppresses voltage fluctuations in the power source 102.

Conventional multilayer capacitors are disclosed in for example Japanese Patent Unexamined Publication No. 2002-164256, Japanese Patent Unexamined Publication No. 2002-151349, Japanese Patent Unexamined Publication No. 2000-323354, Japanese Patent Unexamined Publication No. 11-144996, Japanese Patent Unexamined Publication No. 08-097070, and Japanese Patent Unexamined Publication No. 06-140283.

Along with the increasingly higher operating frequencies of today's CPUs, however, the current fluctuations have become faster and larger. Therefore, the equivalent serial inductance (ESL) of the multilayer capacitor 100 itself shown in FIG. 12 becomes relatively larger. Along with this, the effective inductance becomes larger. As a result, the equivalent serial inductance greatly influences voltage fluctuations of the power source.

That is, in a conventional multilayer capacitor used for the power source circuit of the CPU 104 shown in FIG. 12, since the ESL of the parasitic part shown in the equivalent circuit of FIG. 12 is high, along with fluctuations of the current I shown in FIG. 13, the ESL inhibits the charging and discharging of the multilayer capacitor 100. Therefore, in the same way as the above, the fluctuations in the voltage V of the power source easily become greater as shown in FIG. 13. Therefore, it will become impossible to handle the increasingly higher speeds of CPUs in the future.

This is because the voltage fluctuations at the time of transition of the current are approximated by the following equation 1 and therefore the level of the ESL is related to the magnitude of fluctuation of the power source voltage:

$$dV = ESL \cdot di/dt \qquad \text{formula (1)}$$

Here, dV is transitory fluctuation of voltage (V), "i" is the amount of current fluctuation (A), and "t" is the time of fluctuation (sec).

Here, the appearance of this conventional capacitor is shown in FIG. 14, while the internal structure is shown in FIG. 15. Below, a conventional multilayer capacitor 100 will be explained based on these figures. That is, the conventional multilayer capacitor 100 shown in FIG. 14 is structured to give an electrostatic capacity by alternately stacking pairs of ceramic layers 112A each provided with two types of internal conductors 114 and 116 shown in FIG. 15 and forming a dielectric body 112.

Further, these two types of internal conductors 114 and 116 are led out to alternately facing two side surfaces 112B and 112C. Further, the terminal electrode 118 connected to the internal conductors 114 and the terminal electrode 120 connected to the internal conductors 116 are set at the alternately facing side surfaces 112B and 112C of the multilayer capacitor 100 shown in FIG. 14.

As shown in FIG. 16, the multilayer capacitor 100 is mounted with the ceramic layers 112A stacked along the perpendicular direction (Z-direction) with respect to the surface of a multilayer board 122, so the surfaces of the internal conductors 114 and 116 become horizontal with respect to the surface of the multilayer board 122. Therefore, the distance from the land patterns 124 of the conductor parts of the multilayer board 122 to the internal conductors 114 and 116 in the dielectric body 112 becomes longer and the area occupied by the current loop E becomes larger. As a result, in the conventional structure, there is the defect that the total inductance increases and along with this the effective inductance also ends up increasing.

In this way, as factors causing an increase in the voltage fluctuations of the power source, there are not only the ESL of the capacitor itself, but also the total inductance. The sum of the ESL and the total inductance has a great effect on the voltage fluctuations of the power source as the effective inductance. Therefore, it is necessary to reduce this effective inductance.

On the other hand, the structure shown in FIG. 17 may be considered as a mounting structure for avoiding an increase in the total inductance. In the mounting structure shown in the figure, the stacking direction of the internal conductors is made 90 degrees different from the structure shown in FIG. 16 and the ceramic layers 112A are stacked in the Y-direction along the surface of the multilayer board 122.

That is, the surfaces of the internal conductors 114 and 116 are perpendicular to the surface of the multilayer board 122 on which the multilayer capacitor 100 is mounted. Along with this, the current loop E becomes shorter. As a result, the total inductance is reduced.

However, no matter which structure is used, in the past, the total inductance could not be sufficiently reduced and it was not possible to eliminate the defect of the large effective inductance.

DISCLOSURE OF THE INVENTION

The present invention has as its object the provision of a multilayer capacitor capable of greatly reducing the effective inductance and reducing the voltage fluctuations in the CPU power source.

To achieve this object, the multilayer capacitor according to the present invention is a multilayer capacitor having a dielectric layer and two types of, that is, first and second, internal conductor layers insulated from each other by a dielectric layer and alternately arranged in a dielectric body, the multilayer capacitor characterized in that the first internal conductor layer is formed with at least one first cut part, the second internal conductor layer is formed with at least one second cut part, and, due to the cut parts, each internal conductor layer is formed with at least two channel parts connected at an uncut end in the same plane and channel parts adjoining each other in the same plane carry current flowing in reverse directions.

In the multilayer capacitor according to the present invention, when powering up the multilayer capacitor, the direction of flow of the current becomes reverse between the channel parts positioned across the cut part in the same internal conductor. Along with this, the magnetic fluxes generated by the high frequency current flowing through the internal conductor layer are canceled out by each other, the parasitic capacity of the multilayer capacitor itself becomes smaller, and the equivalent serial inductance (ESL) is reduced. Therefore, in the multilayer capacitor according to the present invention, the loop inductance is reduced, a reduction in the ESL is achieved, and the effective inductance is greatly reduced. As a result, in the present invention, oscillation of voltage of the power source can be reliably suppressed and a multilayer capacitor optimal for use as a CPU power source is obtained. Further, since the lengths of the channels become larger due to the cut part, the equivalent serial resistance (ESR) becomes larger and the balance between the ESR and ESL becomes better.

Preferably, the first conductor layer is formed with a first lead part and the second conductor layer is formed with a second lead part at a position different from the first lead part so that current flows in reverse directions between the channel parts formed at the first and second internal conductor layers adjoining each other across the dielectric layer.

In this case, current flows in reverse directions even at corresponding channels adjoining each other across the dielectric layer. Along with this, the magnetic fluxes generated by the high frequency current flowing through the internal conductor are canceled out by each other and the ESL can be reduced.

Preferably, the lead parts are formed so as to be led out to only one surface of the dielectric body.

More preferably, the one surface of the dielectric body where the lead parts are led out to is formed with a first terminal electrode connected to the first lead parts and a second terminal electrode insulated so as not to be directly connected with the first terminal electrode and connected to the second lead parts.

More preferably, the dielectric body is a rectangular parallelepiped, a length of a side of the dielectric body running along the stacking direction of the dielectric layers is made longer than a length of any other two sides running along a direction intersecting the side running along the stacking direction, and said one surface of the dielectric body is formed with the first terminal electrode and second terminal electrode.

More preferably, said one surface of the dielectric body is formed with the first terminal electrode and second terminal electrode so as to extend along the stacking direction substantially in parallel at a predetermined interval.

By leading out lead parts to only one surface of the dielectric body (preferably the bottom surface), when mounting the multilayer capacitor on the board, mounting of the multilayer capacitor, in case that the stacking direction of the dielectric layers extends along the surface of the board, becomes easier. That is, it becomes easier to structure the capacitor so that the surfaces of the internal conductor layers are perpendicular to the surface of the board on which the multilayer capacitor is mounted. Further, along with this, the current loop becomes shorter and as a result the loop inductance is reduced.

Further, by forming the first terminal electrode and second terminal electrode on one surface of the dielectric body (preferably the bottom surface), it is possible to reduce to the minimum necessary extent the solder for connecting these electrodes to the interconnect layer of the board and possible to suppress to a minimum the effects of thermal distortion.

Preferably, the first lead part is formed near one first end in the longitudinal direction of the dielectric layer, and the second lead part is formed near another second end in the longitudinal direction of the dielectric layer. By configuring the capacitor in this way, it becomes easy to lead the lead parts out to only one surface of the dielectric body (preferably the bottom surface).

Preferably, the first and second cut parts for forming the channel parts in first and second internal conductor layers adjoining each other across the dielectric layer are formed at substantially the same positions between the internal conductor layers adjoining each other. By configuring the capacitor in this way, it becomes easier to make the directions of current flowing through the channel parts formed at the first and second internal conductor layers adjoining each other across the dielectric layer reverse directions.

Preferably, a starting point of the first cut part formed in the first internal conductor layer starts from near the first lead part of the first internal conductor layer, a starting point of the second cut part formed in the second internal conductor layer starts from near the second lead part of the second internal conductor layer, and these cut parts are formed at substantially the same positions at adjoining internal conductor layers. By configuring the capacitor in this way, it becomes easier to make the directions of current flowing through the channel parts formed at the first and second internal conductor layer adjoining each other across the dielectric layer reverse directions.

Preferably, the first cut part formed at the first internal conductor layer is substantially L-shaped, the second cut part formed at the second internal conductor layer is a linear shape running through a substantial center of the dielectric layer along a longitudinal direction of the dielectric layer, and the first cut part and the second cut part are formed at substantially the same positions across the dielectric layer. By configuring the capacitor in this way, it becomes easier to make the directions of current flowing through the channel parts formed at the first and second internal conductor layers adjoining each other across the dielectric layer reverse directions.

Preferably, the first internal conductor layer is formed with a plurality of first cut parts, the second internal conductor layer is formed with a plurality of second cut parts at positions corresponding to the first cut parts, and uncut ends of corresponding cut parts across the dielectric layer are formed at opposite sides along the longitudinal direction of the cut parts. By configuring the capacitor in this way, the number of channels through which current flows in reverse directions in the same plane in one internal conductor layer increases. Further, it becomes easier to make the directions of current flowing through the channel parts formed at the first and second internal conductor layers adjoining each other across the dielectric layer reverse directions.

Preferably, one of the channel parts formed by the first cut part is extended to form a first lead part and one of the channel parts formed by the second cut part is extended to form a second lead part. By configuring the capacitor in this way, the flow of current from the lead parts to the channel parts becomes smoother.

In the present invention, the first lead part may be led out to a first side surface of the dielectric body, and the second lead part may be led out to another second side surface of the dielectric body facing the first side surface.

In this case, the first side surface is preferably formed with a first terminal electrode connected to lead parts of the first internal conductor layers, and the second side surface is preferably formed with a second terminal electrode connected to lead parts of the second internal conductor layers.

In this case, the dielectric body is a rectangular parallelepiped, the length of a side of the dielectric body running along the stacking direction of the dielectric layers is made longer than the length of any other two sides running along a direction intersecting the side running along the stacking direction, and opposite side surfaces of the dielectric body are formed with the first terminal electrode and second terminal electrode.

In the present invention, from the point for reducing the loop inductance as a result of the shorter distance between terminal electrodes, it is most preferable to lead the lead parts out to just one surface (preferably the bottom surface). However, in the present invention, it is also possible to lead the lead parts out toward opposite side surfaces of the dielectric body and form terminal electrodes at those opposite side surfaces.

Preferably, the first and second cut parts are formed running through a center part of each internal conductor layer along a longitudinal direction of each internal conductor layer and the uncut ends of the cut parts are arranged alternately opposite from each other via the dielectric layer. By configuring the capacitor in this way, it becomes easier to make the directions of current flowing through the channel parts formed at first and second internal conductor layers adjoining each other via the dielectric layer reverse directions.

Preferably, the width of the channel parts and the width of the second lead part are substantially the same. By configuring the capacitor in this way, the flow of current from the lead part to the channel parts becomes smoother.

Alternatively, the width of the first and second lead parts may be made larger than the width of the channel parts. By making the width of the lead parts larger, connection between the terminal electrodes formed at the outside of the dielectric body and the lead parts becomes more reliable.

In the present invention, the first and second cut parts may be formed in the internal conductor layers to be alternately opposite in substantially perpendicular direction with respect to the longitudinal direction of the dielectric layer.

Alternatively, the first and second cut parts may be formed in the internal conductor layers to be alternately opposite in longitudinal direction of the dielectric layer. Alternatively, the first and second cut parts may be formed in the internal conductor layers to be alternately opposite in direction of inclination with respect to the longitudinal direction of the dielectric layer.

By forming a plurality of cut parts in one internal conductor layer, the number of the channels through which the current flows in reverse directions in the same plane in the internal conductor layer increases. Further, it becomes easy to make the direction of the current flowing through the channel parts formed at first and second internal conductor layers adjoining each other across a dielectric layer reverse directions.

In the present invention, preferably the width of the uncut ends is equal to the width of the channels. If the width of an uncut end is too narrow compared with the width of the channels, the electrical resistance at that part will tend to become larger.

In the present invention, preferably the width of the cut parts is 100 to 200 μm. If the width of the cut part is too narrow, maintaining the insulation property will tend to become difficult, while if the width is too wide, the electrode area in the limited space will be reduced, so the electrostatic capacity of the capacitor will tend to become smaller.

BRIEF DESCRIPTION OF THE DRAWINGS

The present invention will be explained in detail based on the embodiments shown in the drawings.

DESCRIPTION OF THE PREFERRED EMBODIMENTS

First Embodiment

Figure 1:
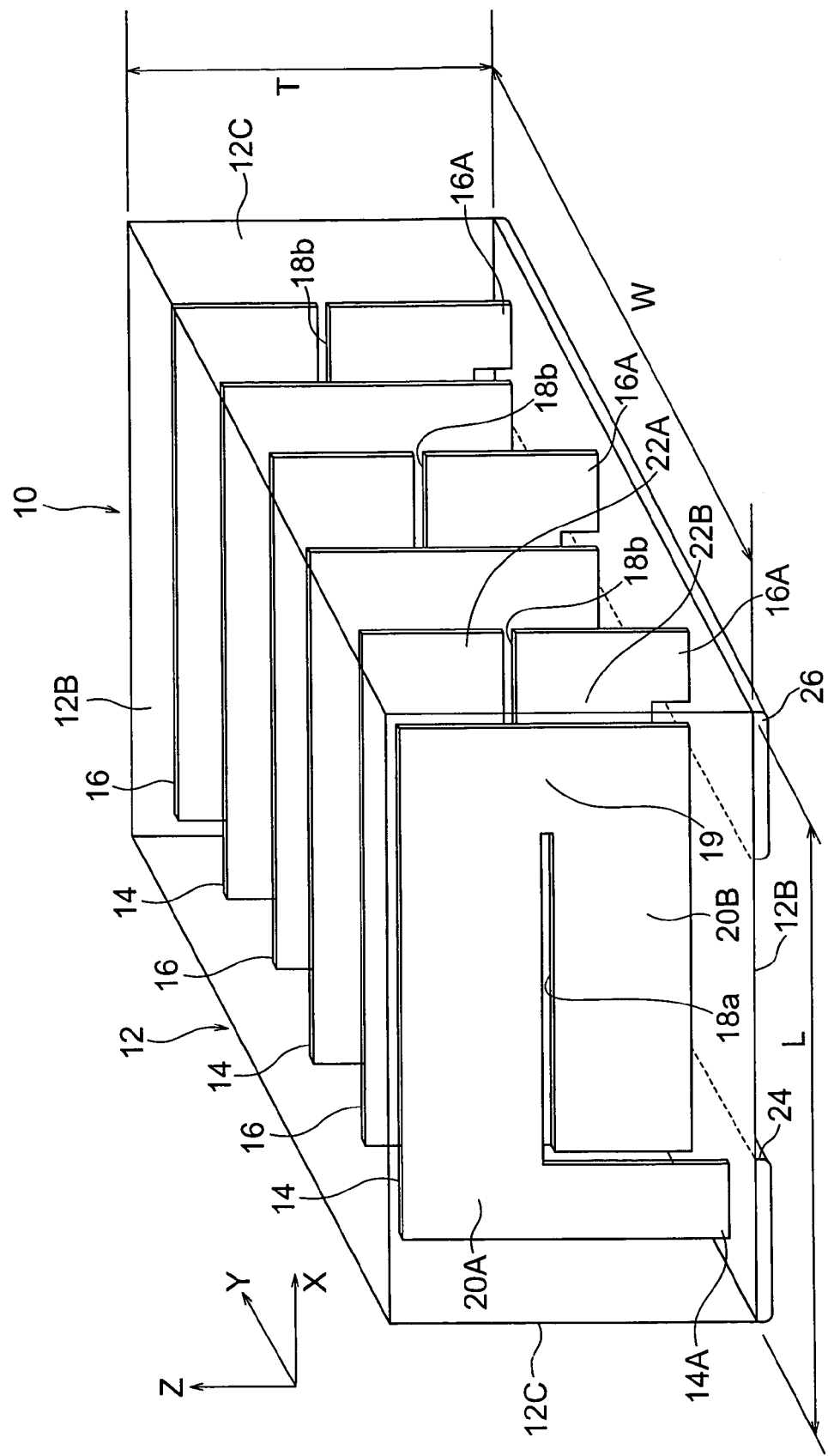
FIG. 1 is a perspective view of a multilayer capacitor according to a first embodiment of the present invention.
Figure 2:
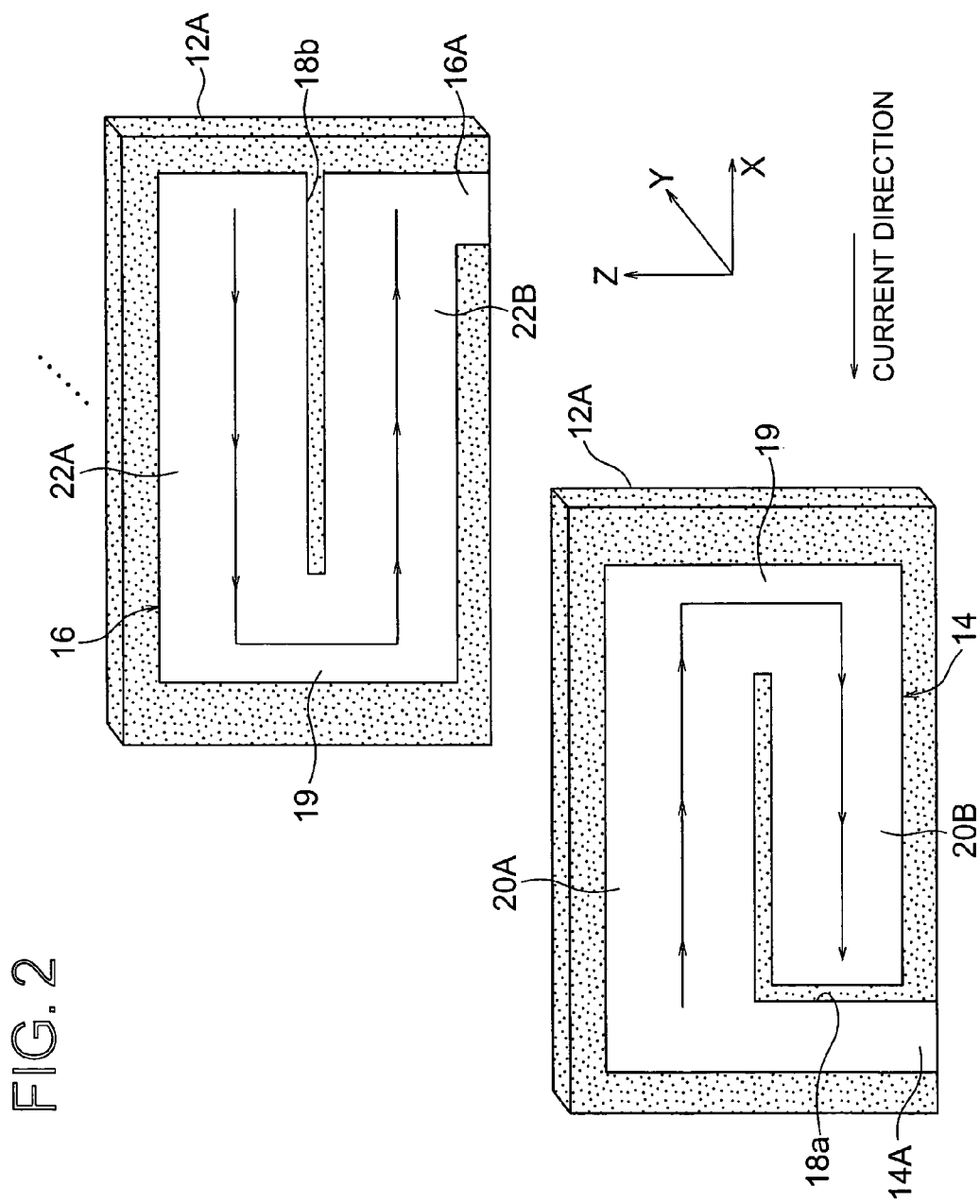
FIG. 2 is a disassembled perspective view of the multilayer capacitor shown in FIG. 1 and shows the parts of the two types of internal conductors.
Figure 3:
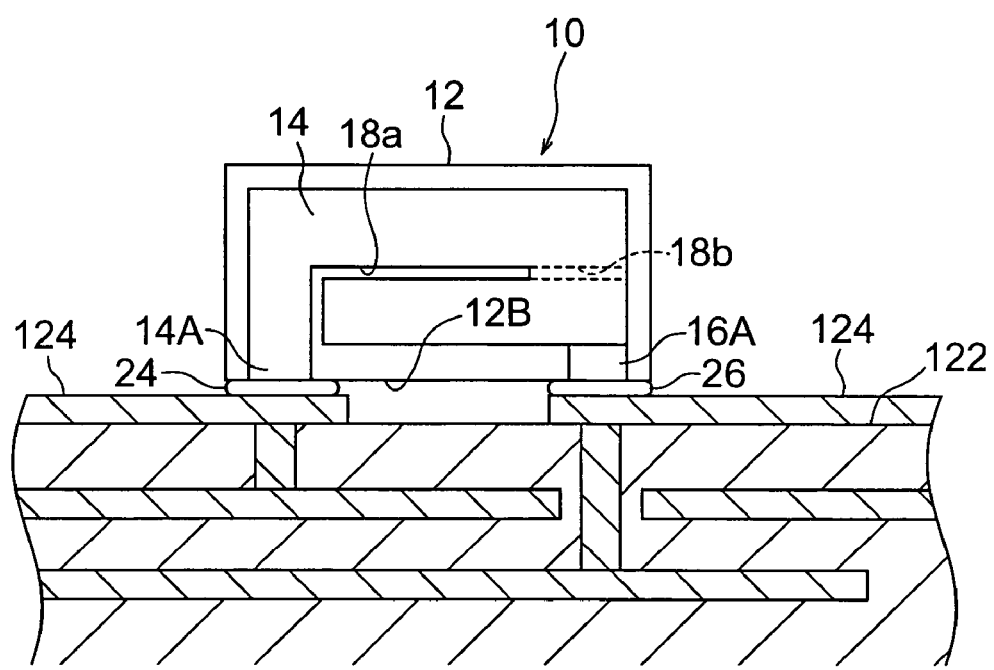
FIG. 3 is a sectional view of the mounting structure of a multilayer capacitor shown in FIG. 1.

First, the multilayer capacitor according to a first embodiment of the present invention will be explained. The multilayer ceramic capacitor serving as the multilayer capacitor according to the present invention (hereinafter simply referred to as a "multilayer capacitor") 10 according to the present embodiment is shown in FIG. 1 to FIG. 3. As shown in these figures, the multilayer capacitor 10 is comprised of, as a main part, a dielectric body 12 comprised of a rectangular parallelepiped shaped sintered body obtained by sintering a stack of a plurality of ceramic green sheets comprising dielectric sheets.

A planar shaped internal conductor layer (first internal conductor layer) 14 is arranged at a predetermined position inside the dielectric body 12. A similar planar shaped internal conductor layer (second internal conductor layer) 16 is arranged inside the dielectric body 12 at farer side in the stacking direction Y than the internal conductor layer 14 separated by the ceramic layer 12A used as the dielectric layer. These internal conductor layer 14 and internal conductor layer 16 are arranged in the dielectric body. 12 facing each other separated by the ceramic layer (dielectric layer) 12A.

In the present embodiment, the internal conductor layer 14 and internal conductor layer 16 are arranged in that order in the dielectric body with the ceramic layer 12A comprised of a sintered dielectric sheet sandwiched between them. At the far side of the internal conductor layer 16 in the stacking direction Y, as shown in FIG. 1, these two electrodes are repeated in the same order. A total of for example 10 of these sets are arranged.

Further, the centers of these internal conductor layers 14 and internal conductor layers 16 are arranged at substantially the same positions as the center of the dielectric body 12. Further, the vertical and horizontal dimensions of the internal conductor layers 14 and internal conductor layers 16 are made smaller than the lengths of the corresponding sides of the dielectric body 12. Further, as the materials of the internal conductors 14 and 16 formed in substantially rectangular shapes, not only may base metal materials such as nickel, nickel alloys, copper, or copper alloys be considered, but also materials mainly comprised of these metals may be considered.

On the other hand, the length W of the side of the dielectric body 12 running along the stacking direction Y of the ceramic layers 12A is made longer than the lengths L and T of any other two sides running along the direction X or Z intersecting the side running along the stacking direction Y. That is, the length W of the side running along the stacking direction 9 is not only made longer than the X-direction length L, but also is made longer than the Z-direction length T. Note that in FIG. 1 and FIG. 2, the stacking direction is made the Y-direction, the vertical direction is made the Z-direction, and the horizontal direction orthogonal to the Y-direction and Z-direction is made the X-direction.

As shown in FIG. 1 and FIG. 2, a single lead part (first lead part) 14A is formed led out from the end at the left side of the longitudinal direction (X-direction) of an internal conductor layer 14 toward the downward direction. Further, a single lead part (second lead part) 16A is formed led out from the end at the right side of the longitudinal direction (X-direction) of an internal conductor layer 16 toward the downward direction. That is, the lead part 14A and lead part 16A are led out from the two ends of the internal conductor layers 14 and 16 in the X-direction in a not overlapping different positional relationship toward only the bottom surface (bottom surface) 12B of FIG. 1.

Further, as shown in FIG. 1, the terminal electrode (first terminal electrode) 24 connected to the lead parts 14A of the internal conductor layers 14 and the terminal electrode (second terminal electrode) 26 connected to the lead parts 16A of the internal conductor layers 16 are arranged at the bottom surface 12B of the dielectric body 12 in the Z-direction. Therefore, the adjoining terminal electrodes are connected to different internal conductor layers 14 and 16 through the lead parts 14A and 16A. These terminal electrodes 24 and 26 are arranged insulated from each other at the bottom surface 12B of the dielectric body 12. These adjoining terminal electrodes can be used at opposite polarities from each other.

In the present embodiment, the bottom surface 12B of the multilayer capacitor 10 has the terminal electrodes 24 and 26 arranged at it. Therefore, one of the side surfaces 12B in the four side surfaces 12B and 12C of the dielectric body 12 made the rectangular parallelepiped, that is, a hexagonal shape, has the terminal electrodes 24 and 26 arranged at it. Further, these terminal electrodes 24 and 26 are formed at the bottom surface 12B of the dielectric body 12 extending across a predetermined interval substantially in parallel in the stacking direction Y.

Further, in the present embodiment, the terminal electrode 24 is for example connected to the electrodes of the CPU so that the internal conductor layers 14 and 16 become the electrodes of the capacitor. Further, the terminal electrode 26 is for example connected to the grounded side. These adjoining terminal electrodes can be used at opposite polarities from each other.

Specifically, the multilayer capacitor 10 is soldered to the multilayer board 122 shown in FIG. 3, whereby the land patterns 124 of the multilayer board 122 and the terminal electrodes 24 and 26 are connected.

In the present embodiment, an internal conductor layer 14 is formed with a cut part (first cut part) 18a. The cut part 18a formed at the internal conductor layer 14 is substantially L-shaped and has a vertical cut starting at the right side of the lead part 14A and extending in the upward direction Z and a horizontal cut connected with the vertical cut and extending through the center part of the internal conductor layer 14 in the horizontal direction X on a straight line.

Further, an internal conductor layer 16 is formed with a cut part (second cut part) 18b extending in the horizontal direction on a straight line from the middle of the right end side of the internal conductor layer 16. The starting point of the cut part 18b is near the lead part 16A of the internal conductor layer 16. The main part (horizontal cut) of the cut part 18a and the main part (horizontal cut) of the cut part 18b are formed at substantially the same positions with each other. However, the uncut ends 19 of the cut parts 18a and 18b are positioned opposite in the X-direction at adjoining internal conductor layers.

By an internal conductor layer 14 being formed with a cut part 18a, a pair of channel parts 20A and 20B is formed across the cut part 18a. Further, by an internal conductor layer 16 being formed with a cut part 18b, a pair of channel parts 22A and 22B is formed across the cut part 18b. Further, the ends of the pair of channel parts 20A and 20B are connected through the uncut end 19 of the cut part 18a, so current flows in reverse directions at the pair of channels 20A and 20B positioned across the cut part 18a. Further, similarly, the ends of the pair of channel parts 22A and 22B are connected through the uncut end 19 of the cut part 18b, so current flows in reverse directions between them.

For example, when an internal conductor layer 14 becomes a + polarity and simultaneously an internal conductor layer 16 becomes a − polarity, as shown by the direction of the current shown by the arrow marks in FIG. 2, the current flows toward the right side at the channel part 20A of the internal conductor layer 14, and the current flows toward the left side at the channel part 20B. Further, the current flows toward the left side at the channel part 22A of the internal conductor layer 16, and the current flows toward the right side at the channel part 22B.

Therefore, current flows in reverse directions between the channel part 20A and channel part 22A of the internal conductor layers 14 and 16 and between the channel part 20B and channel part 22B adjoining each other across a ceramic layer 12A. The pair of channel parts 20A and 20B and the pair of channels 22A and 22B are arranged at the internal conductor layers 14 and 16 so that the current flows in this relationship.

Note that the width of the cut parts 18a and 18b is not particularly limited, but preferably is 100 to 200 μm. If the width of the cut parts 18a and 18b is too narrow, the insulation property is liable not to be maintained, while if too wide, the widths of the channel parts 20A, 20B, 22A, and 22B tend to become narrower. The width of the channel parts 20A, 20B, 22A, and 22B is preferably 400 to 600 μm. If the width of the channel parts is too narrow, the resistance tends to become too high, while if the width is too wide, achievement of a compact capacitor tends to become difficult.

The lead part 14A of an internal conductor layer 14 is formed extended from the channel part 20A. The width of the lead part 14A is about the same as the widths of the channel parts 20A and 20B. Further, the width of the uncut part 19 is also about the same as the width of the channel parts 20A and 20B.

Next, the action of the multilayer capacitor 10 according to the present embodiment will be explained. According to the multilayer capacitor 10 according to the present embodiment, two types of internal conductor layers 14 and 16 are arranged in a manner between ceramic layers 12A in the dielectric body 12 formed in a rectangular parallelepiped by stacking a plurality of dielectric sheets forming ceramic layers 12A. Therefore, these two types of internal conductor layers 14 and 16 are made capacitor electrodes arranged facing each other in parallel.

Further, the two types of internal conductor layers 14 and 16 have the lead parts 14A and 16A led out toward the same side surface 12B of the dielectric body 12. Terminal electrodes 24 and 26 connected to any of the two types of internal conductor layers 14 and 16 through these lead parts 14A and 16A are set at the same side surface 12B of the dielectric body 12. Further, the length W of the side of the dielectric body 12 running along the stacking direction (Y-direction of FIG. 1) of the ceramic layers 12A is made longer than the lengths L and T of any other two sides of the dielectric body 12 running along the direction intersecting the side running along the stacking direction.

Therefore, when mounting the multilayer capacitor 10 of the present embodiment on the multilayer board 122 shown in FIG. 3, it becomes easy to mount the multilayer capacitor 10 by stacking the ceramic layers 12A along the surface of the multilayer board 122. That is, in the present embodiment, the surfaces of the internal conductor layers 14 and 16 are perpendicular to the surface of the multilayer board 122 on which the multilayer capacitor 10 is mounted. Along with this, the current loop becomes shorter and as a result the loop inductance is reduced.

Further, in the present embodiment, these two types of internal conductor layers 14 and 16 have cut parts 18. The parts of the internal conductor layers 14 straddling the cut parts 18a form the channel parts 20A and 20B. Further, the parts of the internal conductor layers 16 straddling the cut parts 18b form the channel parts 22A and 22B. These channel parts 20A, 20B, 22A, and 22B are arranged so that current flows in reverse directions with the channels of other internal conductor layers 14 and 16 adjoining each other across a ceramic layer 12A.

Therefore, when powering up the multilayer capacitor 10, current flows in reverse directions between channel parts of the internal conductor layers 14 and 16 adjoining each other across a ceramic layer 12A. Along with this, the magnetic fluxes generated by the high frequency current flowing through the internal conductor layers 14 and 16 are canceled out. By reducing the parasitic inductance of the multilayer capacitor 10 itself, the equivalent serial inductance is reduced.

Further, even in the same internal conductor layers 14 and 16, the direction of flow of current becomes reverse between the channel part 20A and channel part 20B and between the channel part 22A and channel part 22B positioned across the cut part 18.

Due to this, the multilayer capacitor 10 according to the present embodiment is reduced in loop inductance, achieves a greater reduction of the ESL, and is greatly reduced in the effective inductance. As a result, according to the present embodiment, it is possible to reliably suppress oscillation of the voltage of the power source, whereby the multilayer capacitor 10 becomes optimal for the power source of a CPU.

Further, the side surface 12B facing the multilayer board 11 on which the multilayer capacitor 10 is mounted has two types of internal conductor layers 14 and 16 led out from it and has terminal electrodes 24 and 26 arranged at it. Therefore, the distance between these terminal electrodes 24 and 26 is shortened and, as a result, the loop inductance is reduced more.

On the other hand, in the present embodiment, pluralities of two types of internal conductors are arranged in the dielectric body 12, so not only does the electrostatic capacity of the multilayer capacitor 10 become higher, but also the action of cancellation of the magnetic fields becomes further greater, the inductance is more greatly reduced, and the ESL is more greatly reduced.

Further, the internal conductor layers 14 and 16 are formed with cut parts 18A and 18B. The path of the current resulting from the channels 20A, 20B, and 20C become relatively longer, so the equivalent serial resistance (ESR) can be made larger. Therefore, the balance between the ESR and ESL becomes better.

Second Embodiment

Next, a multilayer capacitor of a second embodiment of the present invention will be explained based on FIG. 4. Note that members common with members explained in the first embodiment are assigned the same reference numerals and overlapping explanations are omitted.

The multilayer capacitor of the present embodiment is structured substantially the same as the multilayer capacitor of the first embodiment. However, in the present embodiment, as shown in FIG. 4, two cuts 18c and 18d are formed from the bottom side and top side in an internal conductor layer 14 in parallel and in an inclined direction (with respect to X-axis and Y-axis) in the internal conductor layer 14. Further, an internal conductor layer 16 is formed with two cuts 18e and 18f in parallel and in an inclined direction in a substantially reverse positional relationship from the internal conductor layer 14.

As a result, an internal conductor layer 14 is formed with three channel parts 20A, 20B, and 20C across the cut parts 18c and 18d, while an internal conductor layer 16 is formed with three channel parts 22A, 22B, and 22C across the cut parts 18e and 18f. Further, the ends of the three channel parts 20A, 20B, and 20C are alternately connected through the uncut ends 19. Therefore, the three channel parts 20A, 20B, and 20C of an internal conductor layer 14 positioned across the cut parts 18 carry current flowing in reverse directions at the adjoining channel parts. Further, ends of the three channel parts 22A, 22B, and 22C are alternately connected through the uncut ends 19. Therefore, the three channel parts 22A, 22B, and 22C of an internal conductor layer 16 positioned across the cut parts 18 carry current flowing in reverse directions at the adjoining channel parts.

Further, the main parts of the cut parts 18c, 18d, 18e, and 18f are positioned alternately at the same locations and the uncut ends 19 are positioned in opposite directions at the internal conductor layers positioned adjoining them at the two sides across a ceramic layer 12A.

Figure 4:
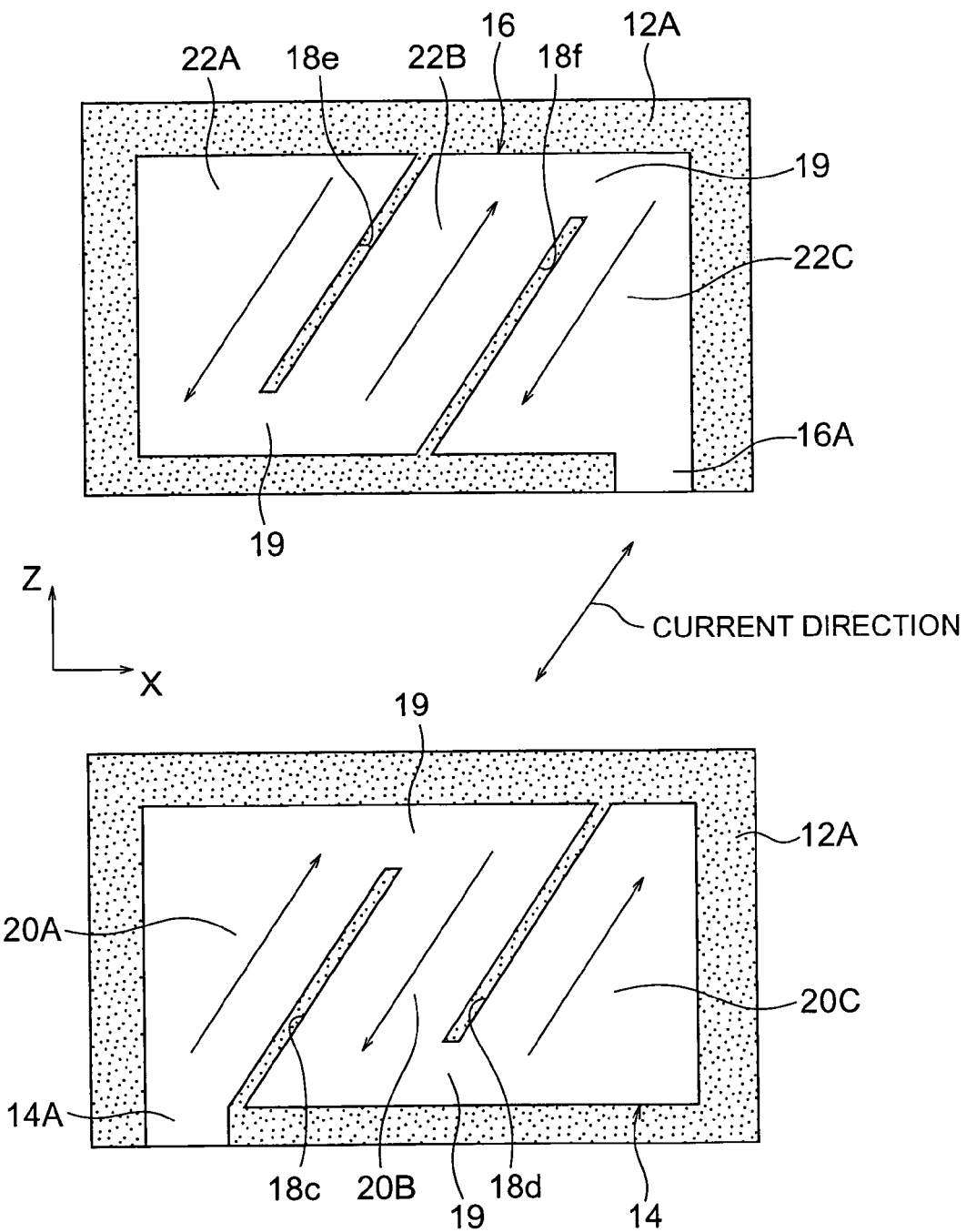
FIG. 4 is a plan view of parts of the two types of internal conductors of the multilayer capacitor according to a second embodiment of the present invention.

Therefore, when for example an internal conductor layer 14 becomes a + polarity and simultaneously an internal conductor layer 16 becomes a − polarity, as shown by the direction of the current shown by the arrow marks in FIG. 4, the current flows toward the top right side at the channel part 20A of the internal conductor layer 14, the current flows toward the bottom left side at the channel part 20B, and the current flows toward the top right side at the channel part 20C. Further, the current flows toward the bottom left side at the channel part 22A of the internal conductor layer 16, the current flows toward the top right side at the channel part 22B, and the current flows toward the bottom left side at the channel part 22C.

Accordingly, current flows in reverse directions between the channel part 20A and channel part 22A of the internal conductor layers 14 and 16 adjoining each other across a ceramic layer 12A, between the channel part 20B and channel part 22B, and between the channel part 20C and channel part 22C. An internal conductor layer 14 has three channel parts 20A, 20B, and 20C arranged at it, while an internal conductor layer 16 has three channel parts 22A, 22B, and 22C arranged at it so as to give this direction of current.

Therefore, in the present embodiment, in the same way as the first embodiment, the loop inductance is reduced, further reduction of the ESL is achieved, and the effective inductance is greatly reduced. Further, the internal conductor layers 14 and 16 are provided with a plurality of cut parts 18, so the total length of the channel parts through which current can flow becomes longer and the effect of reduction of the equivalent serial inductance is further increased.

Third Embodiment

Figure 5:
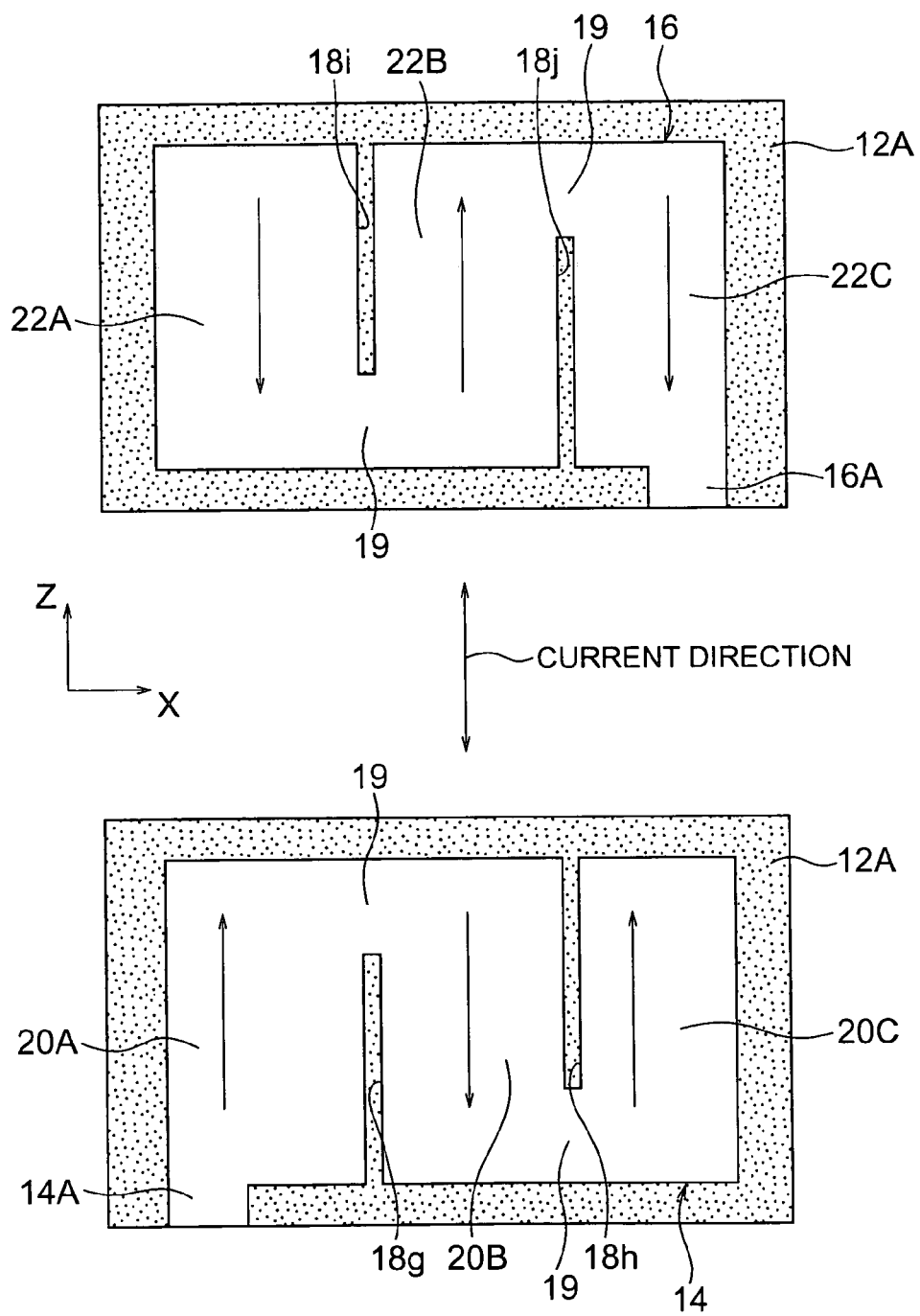
FIG. 5 is a plan view of parts of the two types of internal conductors of the multilayer capacitor according to a third embodiment of the present invention.

Next, a multilayer capacitor of a third embodiment of the present invention will be explained based on FIG. 5. Note that members common with members explained in the first embodiment are assigned the same reference numerals and overlapping explanations are omitted.

The capacitor of the present embodiment is also structured substantially the same as the capacitor of the first embodiment. However, in the present embodiment, the two cuts 18g and 18h are formed from the bottom side and top side of an internal conductor layer 14 in FIG. 5 in parallel and in the vertical direction (with respect to Z-direction) in the internal conductor layer 14. Further, an internal conductor layer 16 is formed with two cuts 18i and 18j in parallel with each other in the vertical direction in a positional relationship substantially opposite to the internal conductor layer 14.

That is, while the cut directions differ, in the same way as the second embodiment, two cut parts 18g to 18j are formed at an internal conductor layer 14 and internal conductor layer 16. Therefore, the present embodiment acts in the same way as the second embodiment and gives not only the effects obtained in the first embodiment, but also the effect of further reduction of the equivalent serial inductance due to the longer total length of the channels through which the current can flow.

Fourth Embodiment

Figure 6:
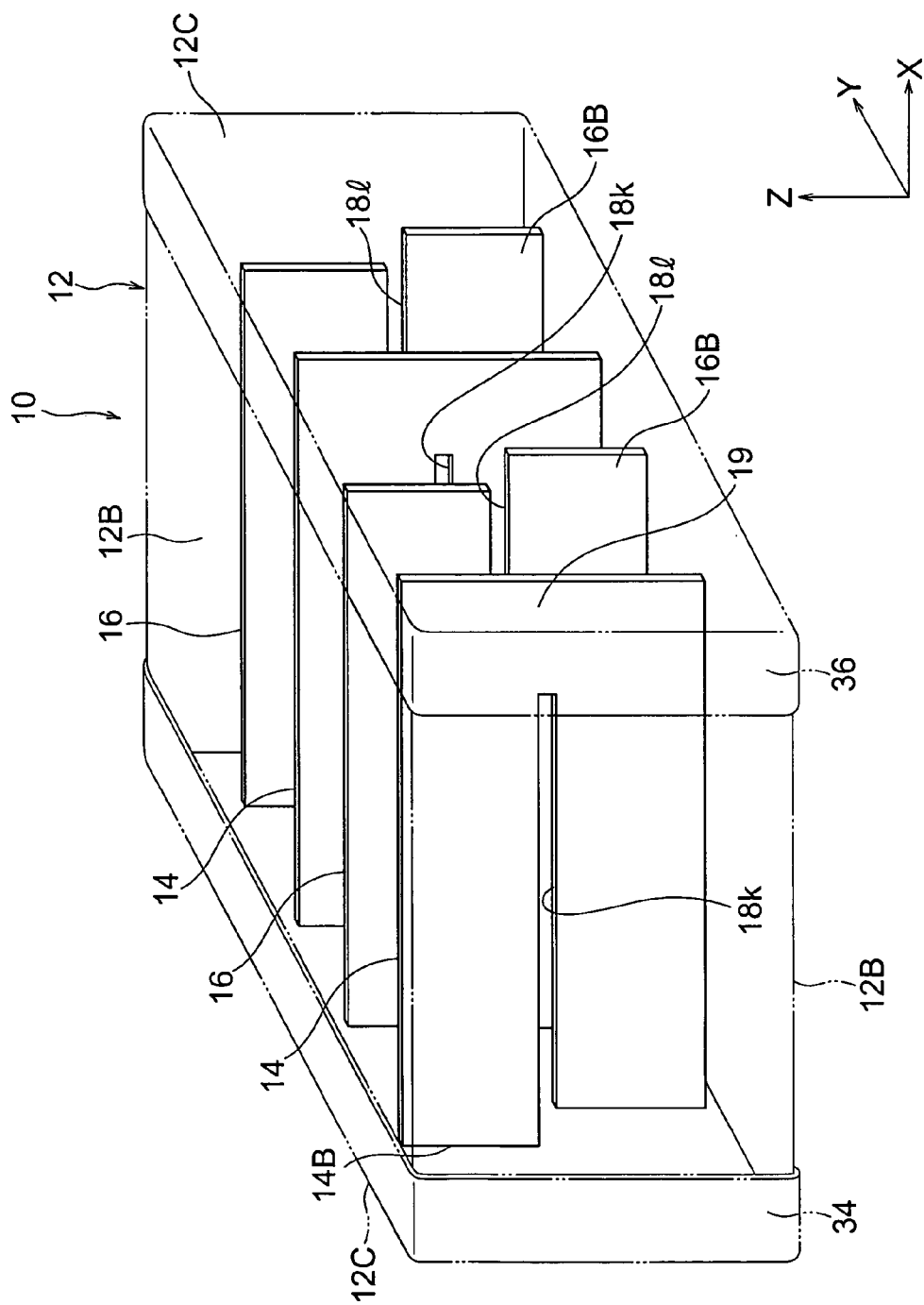
FIG. 6 is a perspective view of a multilayer capacitor according to a fourth embodiment of the present invention.

Next, a multilayer capacitor of a fourth embodiment of the present invention will be explained based on FIG. 6 and FIG. 7. Note that members common with members explained in the first embodiment are assigned the same reference numerals and overlapping explanations are omitted.

The capacitor of the present embodiment is structured in substantially the same way as the capacitor of the first embodiment. However, in the present embodiment, as shown in FIG. 6 and FIG. 7, a lead part 14B is led out at a width of about half of an internal conductor layer 14 from the part of the internal conductor layer 14 near the top side of the left surface toward the left side surface (first side surface) 12C of the dielectric body 12. Further, a lead part 16B is led out at a width of about half of an internal conductor layer 16 (width of channel) from the part of the internal conductor layer 16 near the bottom side of the right surface toward the right side surface (second side surface) 12C of the dielectric body 12.

That is, the two types of internal conductor layers 14 and 16 have the lead parts 14B and 16B led out toward the two facing side surfaces 12C in the X-direction at the dielectric body 12. As shown in FIG. 6, the left side surface 12C among the two facing side surfaces 12C has the terminal electrode (first terminal electrode) 34 connected to the internal conductor layers 14 through the lead parts 14B arranged at it. Further, the right side surface 12C has the terminal electrode (second terminal electrode) 36 connected to the internal conductor layers 16 through the lead parts 16B arranged at it.

Further, a cut 18k extending in the X-direction horizontal direction from the bottom side of each lead part 14B is formed in an internal conductor layer 14, while a cut 18l extending in the X-direction horizontal direction from the top side of each lead part 16B is formed in an internal conductor layer 16.

An internal conductor layer 14 is divided into the pair of channel parts 20A and 20B across the cut part 18k, while an internal conductor layer 16 is divided into the pair of channel parts 22A and 22B across the cut part 18l. However, the pair of channels 20A and 20B is connected at the uncut end 19 at the opposite side to the lead part 14B or 16B. Current flows in reverse directions at the pair of channel parts 20A and 20B. Note that the uncut ends 19 are arranged at different locations across the ceramic layer 12A.

Figure 7:
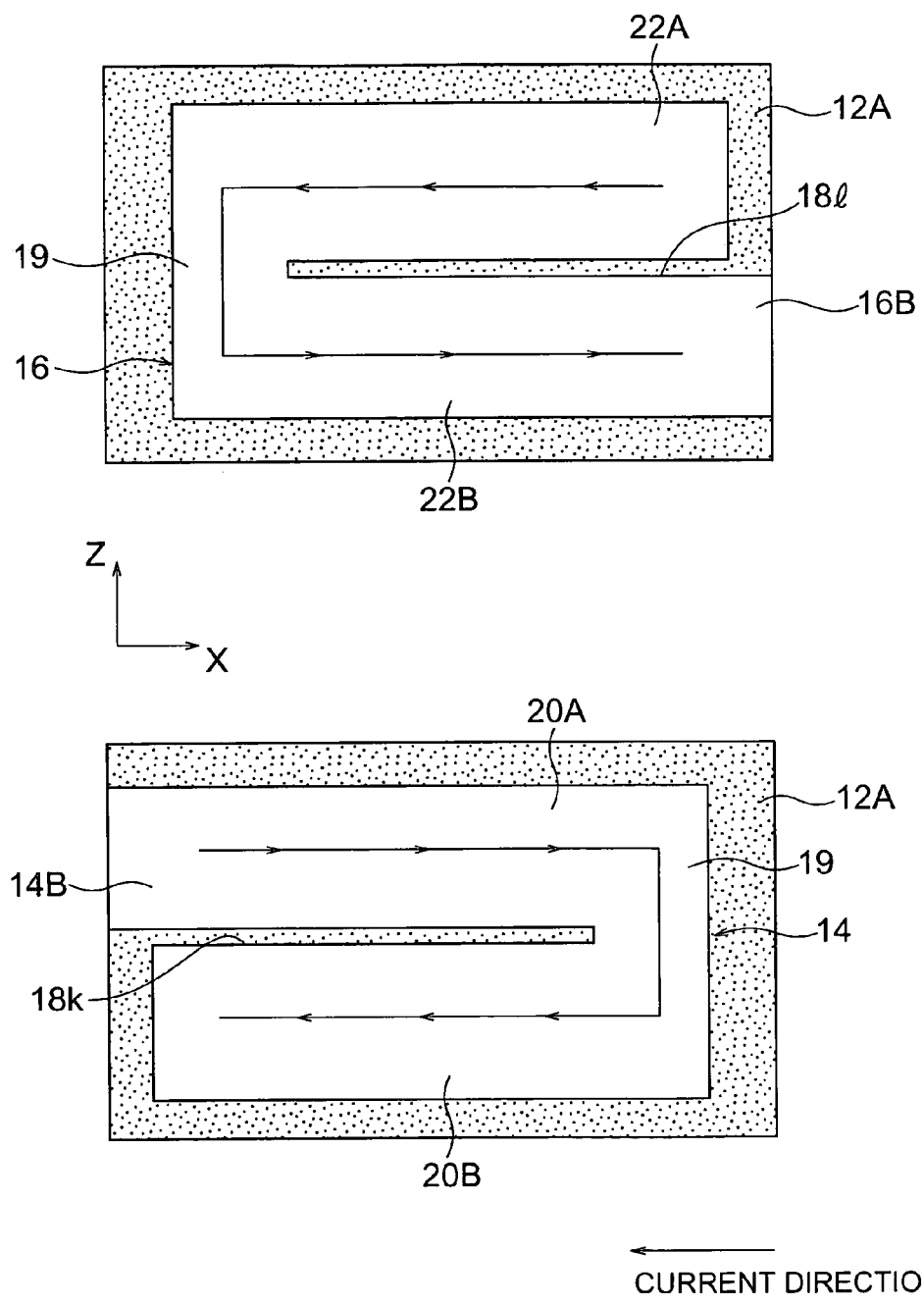
FIG. 7 is a plan view of parts of the two types of internal conductors of the multilayer capacitor shown in FIG. 6.

Therefore, when for example an internal conductor layer 14 becomes a + polarity and simultaneously an internal conductor layer 16 becomes a − polarity, as shown by the direction of the current shown by the arrow marks in FIG. 7, the current flows toward the right side at the channel part 20A of the internal electrode layer 14 and the current flows toward the left side at the channel part 20B. Further, the current flows toward the left side at the channel part 22A of the internal conductor layer 16, while the current flows toward the right side at the channel part 22B.

Therefore, in the same way as the first embodiment, when powering up the multilayer capacitor 10, the equivalent serial inductance is reduced by the current flowing in reverse directions at the channel parts of the internal conductor layers 14 and 16 adjoining each other across a ceramic layer 12A.

Due to the above, the present embodiment, in the same way as the first embodiment, mounts the multilayer capacitor 10 so that the surfaces of the internal conductor layers 14 and 16 become perpendicular to the surface of the multilayer board 122. Therefore, the current loop similarly becomes shorter, and the loop inductance is reduced in the same way as the first embodiment. However, in the present embodiment, unlike the first embodiment, the lead parts 14B and 16B are led out toward the two facing side surfaces 12C of the dielectric body 12. Further, the terminal electrodes 34 and 36 are provided at the two facing side surfaces 12C of the dielectric body 12.

Fifth Embodiment

Figure 8:
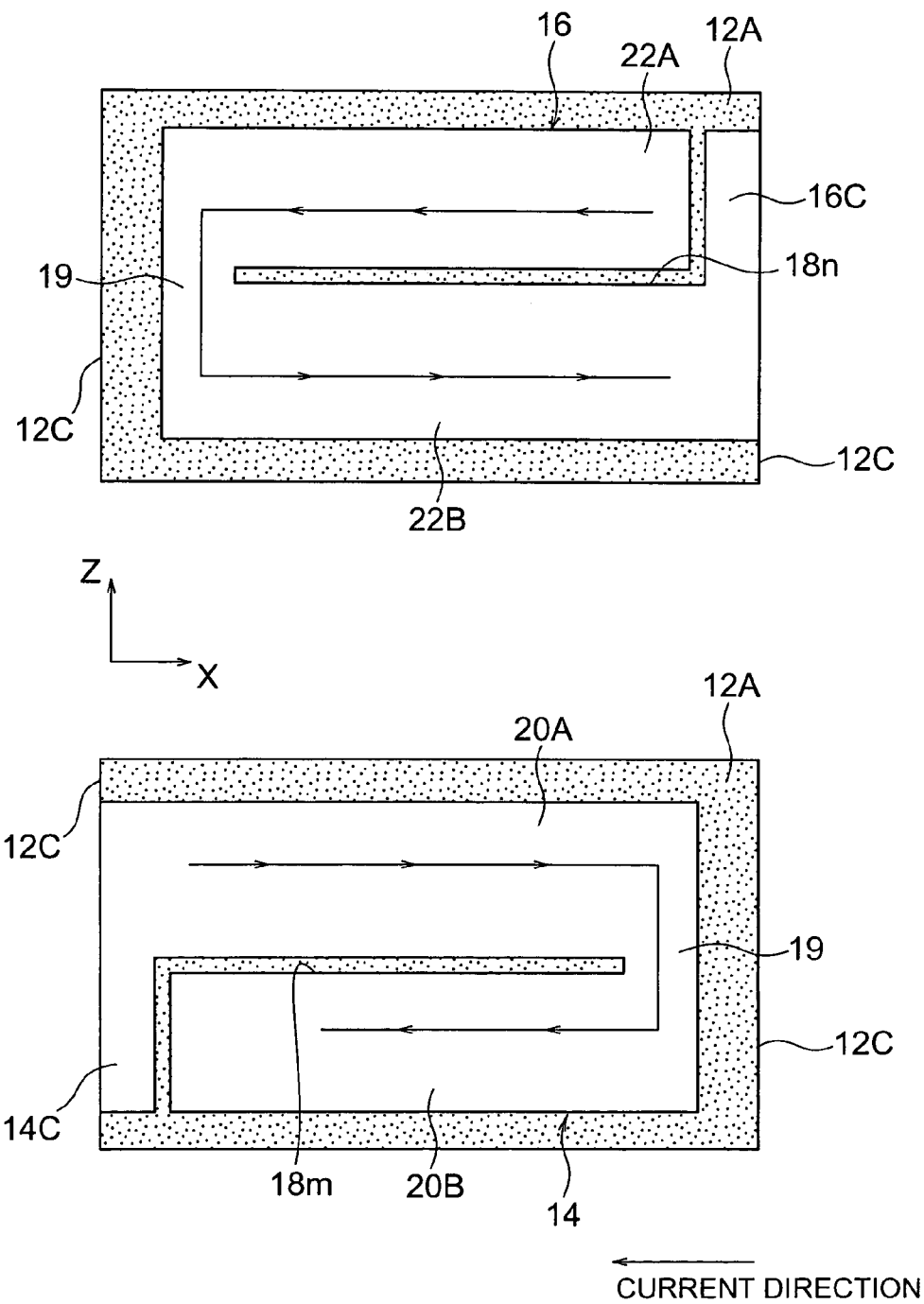
FIG. 8 is a plan view of parts of the two types of internal conductors of the multilayer capacitor according to a fifth embodiment of the present invention.

Next, a multilayer capacitor of a fifth embodiment of the present invention will be explained based on FIG. 8. Note that members common with members explained in the first embodiment are assigned the same reference numerals and overlapping explanations are omitted.

The capacitor of the present embodiment is structured substantially the same way as the capacitor of the first embodiment. In the present embodiment, however, as shown in FIG. 8, a lead part 14C is led out at the entire width of an internal conductor layer 14 in the Z-direction from the internal conductor layer 14 toward the left side surface 12C of the dielectric body 12. Further, a lead part 16C is led out at the entire width of the internal conductor layer 16 in the Z-direction from the internal conductor layer 16 toward the right side surface 12C of the dielectric body 12. That is, the two types of internal conductor layers 14 and 16 have lead parts 14C and 16C led out toward the two facing side surfaces 12C of the dielectric body 12. The widths of these lead parts 14C and 16C are about two times larger than the widths of the channels 20A, 20B, 22A, and 22B.

Further, while not shown, in the same way as the fourth embodiment, the left side surface 12C has a terminal electrode 34 (see FIG. 6) connected to the internal conductor layers 14 through the lead parts 14C arranged at it. Further, the right side surface 12C has a terminal electrode 36 (see FIG. 6) connected to the internal conductor layers 16 through the lead parts 16C arranged at it.

Further, cut parts 18m and 18n similar to the cut parts 18k and 18l of the fourth embodiment are provided at the internal conductor layers 14 and 16. However, in the present embodiment, the part of the cut part 18m close to the left side in an internal conductor layer 14 is bent downward and extends downward until the bottom end of the internal conductor layer 14. Further, the part of the cut part 18m close to the right side in the internal conductor layer 16 is bent upward and extends upward until the top end of the internal conductor layer 16. These cut parts 18m and 18n are substantially L-shaped.

Therefore, in the present invention as well, in the same way as the fourth embodiment, an internal conductor layer 14 is divided into the pair of channels 20A and 20B across the cut part 18m, while an internal conductor layer 16 is divided into the pair of channels 22A and 22B across the cut part 18n. Due to the above, while there is the difference compared with the fourth embodiment in that the widths of the lead parts 14C and 16C are large, the present embodiment exhibits actions and effects similar to the fourth embodiment.

Sixth Embodiment

Next, a multilayer capacitor of a sixth embodiment of the present invention will be explained based on FIG. 9. Note that members common with members explained in the first embodiment are assigned the same reference numerals and overlapping explanations are omitted.

The capacitor of the present embodiment is also structured substantially the same as the capacitor of the first embodiment. However, in the present embodiment, as shown in FIG. 9, a lead part 14C and lead part 16C similar to those of the fifth embodiment are formed at the internal conductor layers 14 and 16. While not shown, the terminal electrodes 34 and 36 (see FIG. 6) are similarly connected to these lead parts 14C and 16C.

Figure 9:
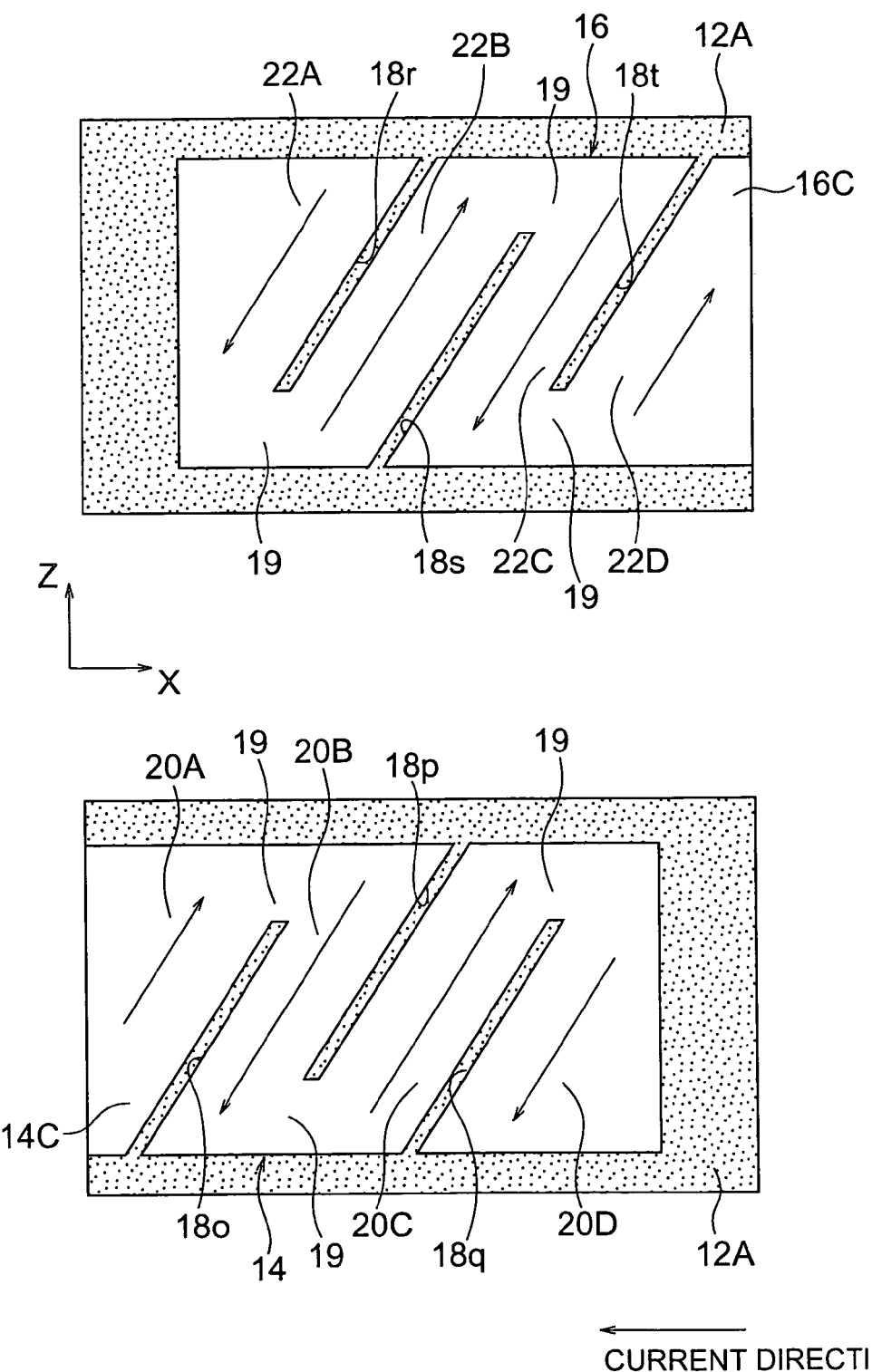
FIG. 9 is a plan view of parts of the two types of internal conductors of the multilayer capacitor according to a sixth embodiment of the present invention.

Further, three cuts 18o to 18q are formed from the bottom side and top side in FIG. 9 in parallel and in an inclined direction offset from each other in an internal conductor layer 14. Further, an internal conductor layer 16 is formed with three cuts 18r to 18t in parallel and in an inclined direction offset from each other in a substantially reverse positional relationship from the internal conductor layer 14.

That is, in the same way as the second embodiment, while cuts in an inclined direction are provided, three cuts are formed at each of the internal conductor layers 14 and 16. Therefore, an internal conductor layer 14 are divided into four channel parts 20A, 20B, 20C, and 20D across the cut parts 18o to 18q. Further, in the same way, an internal conductor layer 16 is divided into the four channel parts 22A, 22B, 22C, and 22D across the cut parts 18r to 18t.

Due to the above, while there is a difference that the number of cut parts 18 is greater, the present embodiment also exhibits actions and effects similar to the first embodiment and second embodiment.

Seventh Embodiment

Figure 10:
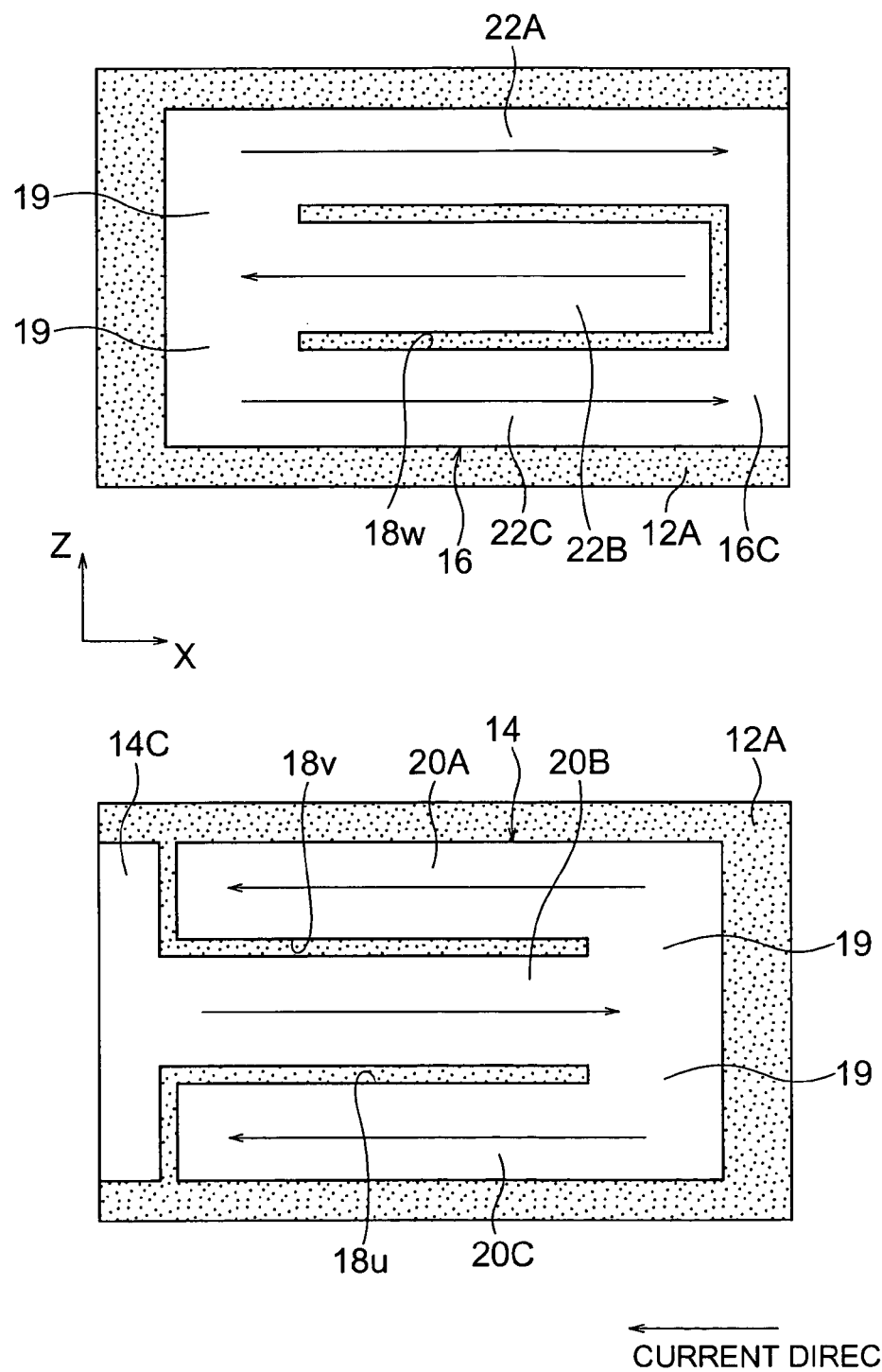
FIG. 10 is a plan view of parts of the two types of internal conductors of the multilayer capacitor according to a seventh embodiment of the present invention.

Next, a seventh embodiment of a multilayer capacitor according to the present invention will be explained based on FIG. 10. Note that members common with members explained in the first embodiment are assigned the same reference numerals and overlapping explanations are omitted.

The capacitor of the present embodiment is structured substantially in the same way as the capacitor of the first embodiment. In the present embodiment, as shown in FIG. 10, the lead part 14C and the lead part 16C similar to the fifth embodiment are formed at the internal conductor layers 14 and 16. While not shown, the terminal electrodes 34 and 36 (see FIG. 6) are similarly connected to the lead parts 14C and 16C.

Further, the internal conductor layers 14 and 16 of the present embodiment are also provided with cut parts 18, but the internal conductor layers 14 of the present embodiment have two cut parts 18u and 18v extending in the horizontal direction above and below. Further, the part of an upper cut part 18v close to the left side is bent upward and extends upward until the top end of the internal conductor layer 14, while the part of a lower cut part 18u close to the left side is bent downward and extends downward until the bottom end of the internal conductor layer 14. These cut parts 18u and 18v are substantially L-shaped.

Further, an internal conductor layer 16 of the present embodiment has two cuts extending in the left-right direction above and below, but these cuts are connected at the right ends to form a single substantially U-shaped cut part 18w.

In the present embodiment, in the same way as the second and third embodiments, an internal conductor layer 14 is divided into three channels 20A, 20B, and 20C across cut parts 18, while an internal conductor layer 16 is divided into three channels 22A, 22B, and 22C across cut parts 18. Therefore, in the present embodiment, in the same way as the second and third embodiments, the total length of the channel parts through which current can flow becomes longer and the effect of reduction of the equivalent serial inductance is increased more.

EXAMPLE

Next, a network analyzer was used to measure the S21 characteristic of the S-parameter of the following samples and find the attenuation characteristics of the samples. First, the content of the samples will be explained. That is, as the capacitor, the general multilayer capacitor shown in FIG. 14 was used as a comparative example and the multilayer capacitor according to the first embodiment shown in FIG. 1 was used as an example of the invention.

Figure 11:
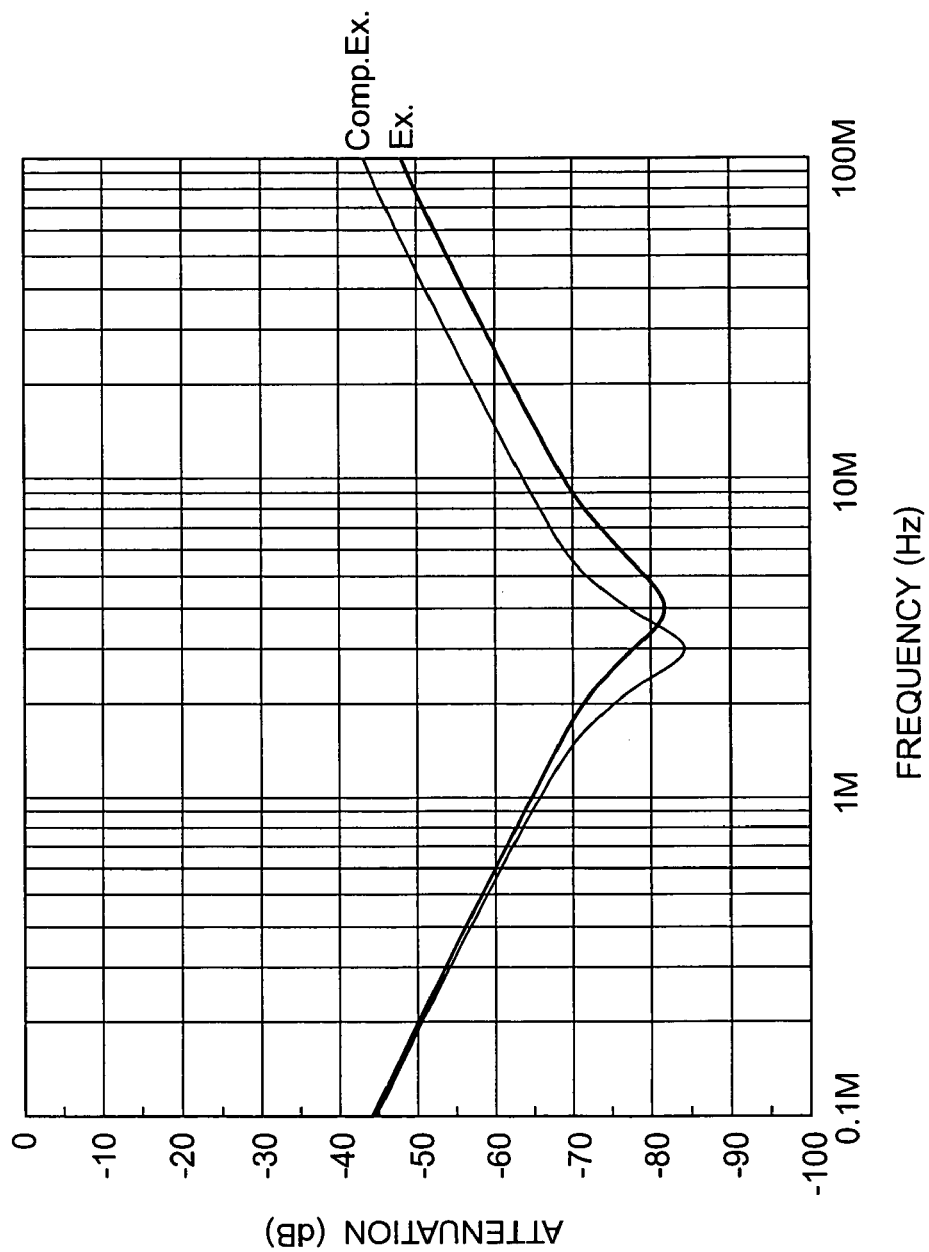
FIG. 11 is a graph of the attenuation characteristics of different samples.
Figure 12:
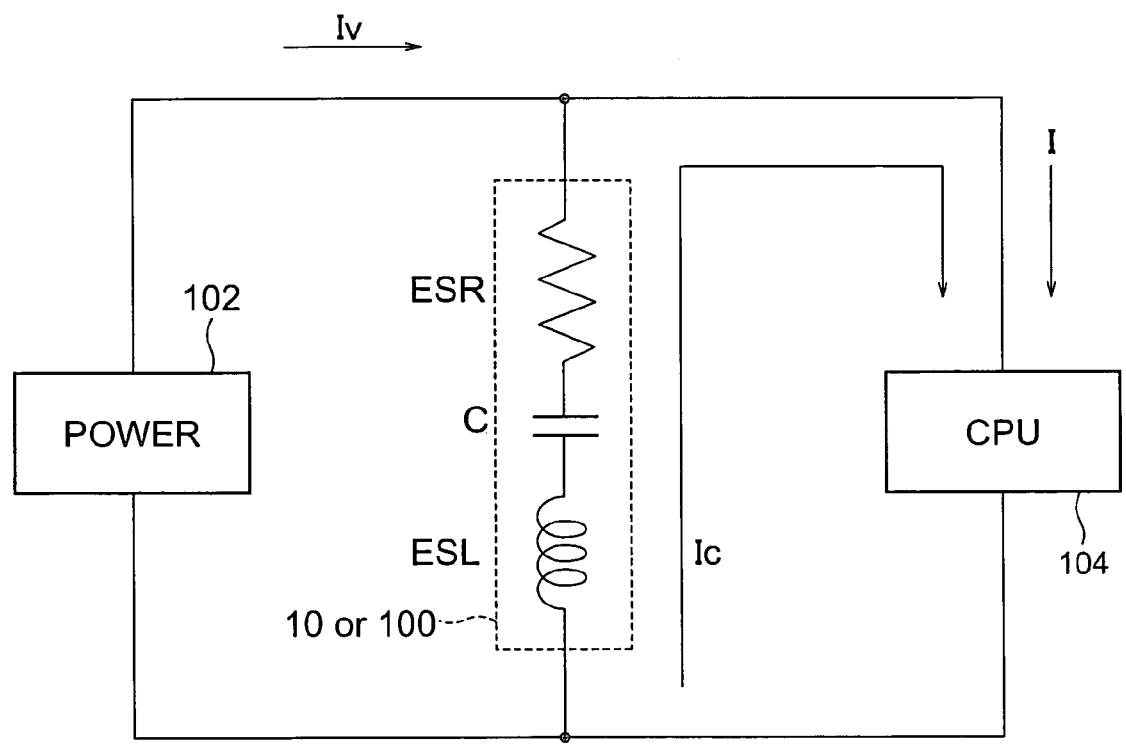
FIG. 12 is a diagram of a circuit employing the multilayer capacitor.
Figure 13:
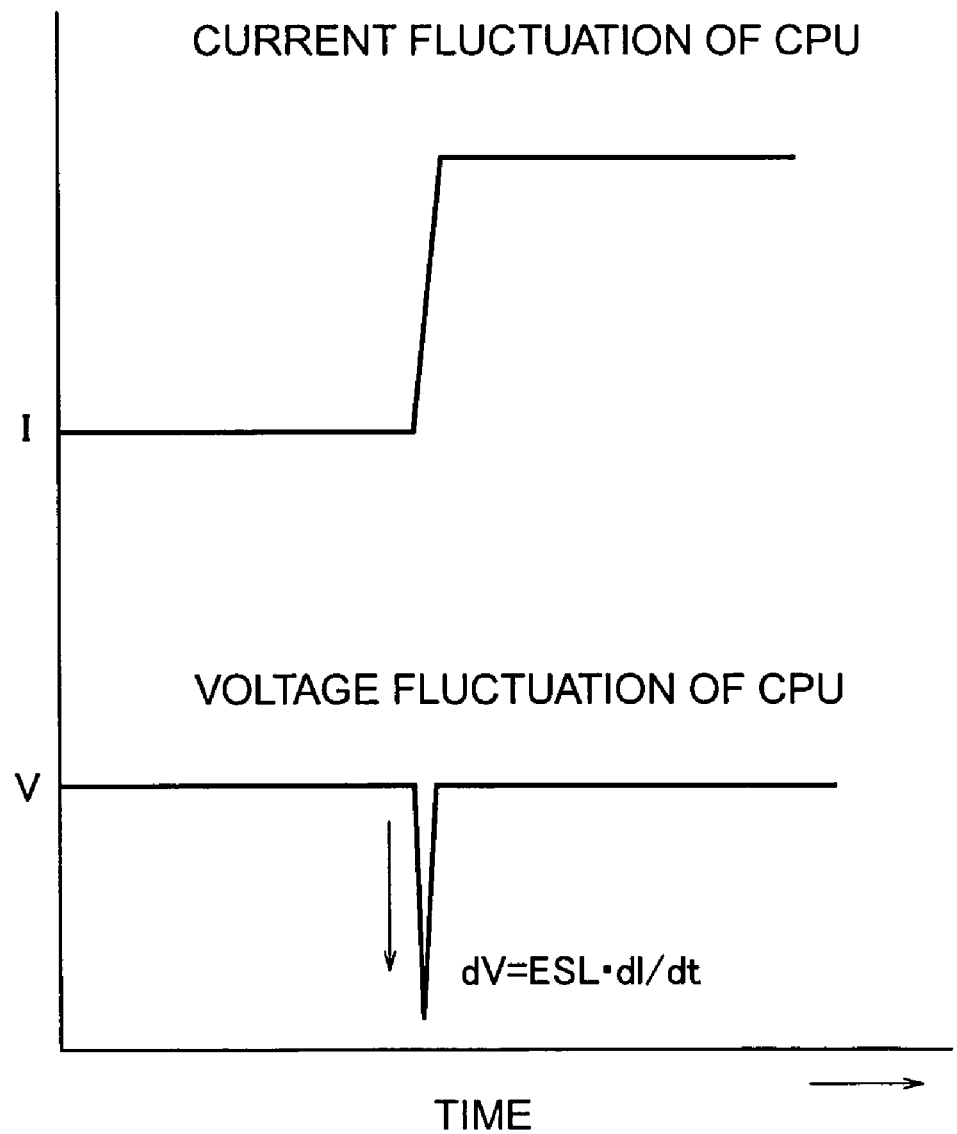
FIG. 13 is a graph of the relationship between current fluctuation and voltage fluctuation in a circuit employing a multilayer capacitor of the related art.

Here, the constants of the equivalent circuit were calculated so that the measured value of the attenuation characteristic and the amount of attenuation of the equivalent circuit in the multilayer capacitor 100 shown in FIG. 12 matched. Further, from the data of the attenuation characteristics of the samples shown in FIG. 11, it is learned that the amount of attenuation of the example in the high frequency band of 5 MHz or more increased by about 5 dB compared with the comparative example. Therefore, from the data, it can be understood that improvement of the high frequency characteristics is seen in the example.

On the other hand, relating to the calculated ESL as well, the ESL was greatly reduced to 172.7 pH compared with the 288.5 pH of the comparative example. The effect of the present invention could be confirmed by being verified by these values.

Figure 14:
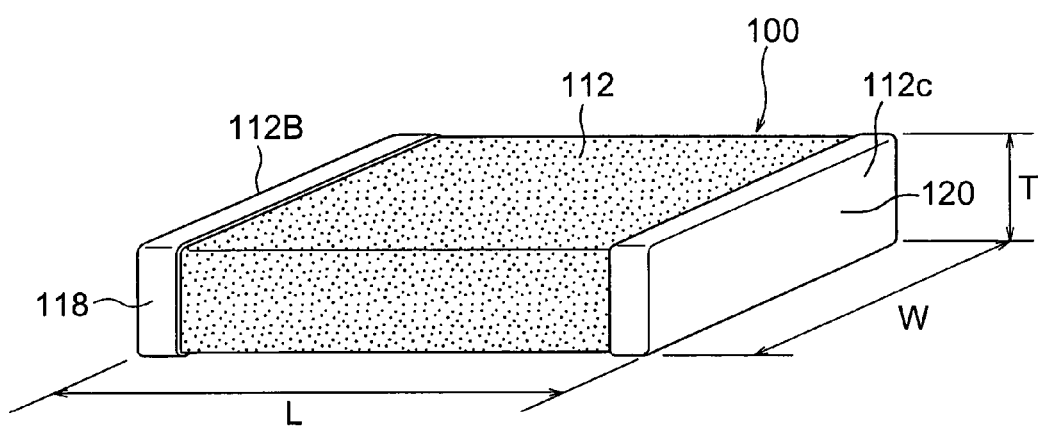
FIG. 14 is a perspective view of parts of internal conductors of a multilayer capacitor shown in FIG. 14.
Figure 15:
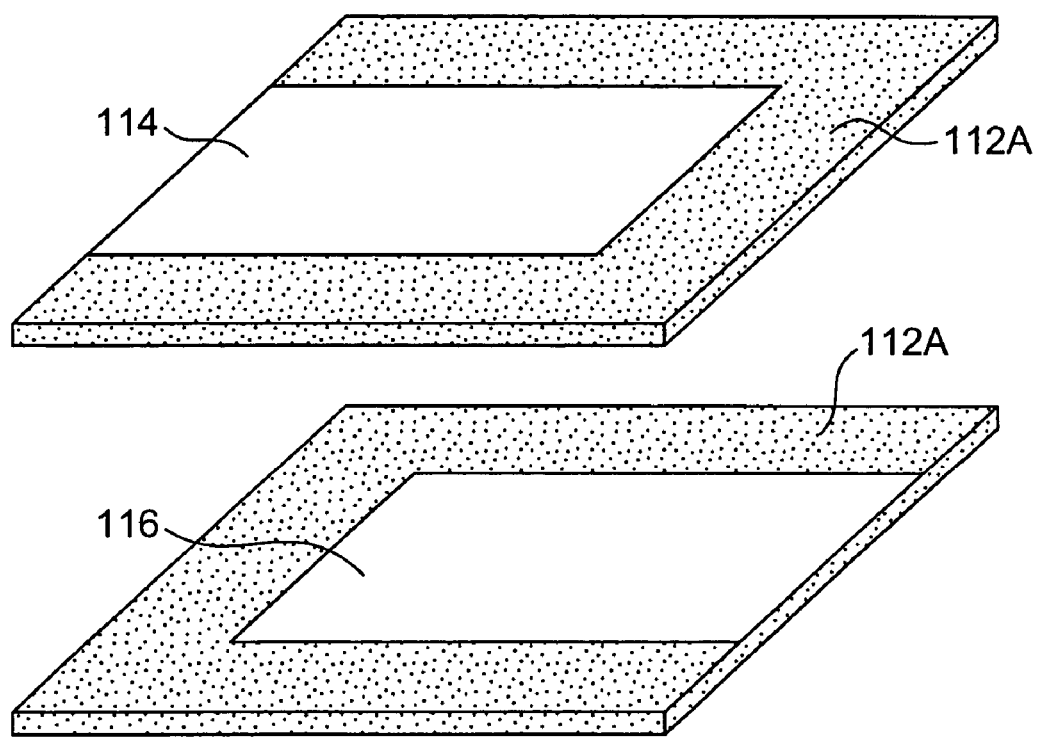
FIG. 15 is a disassembled perspective view of parts of internal conductors of the multilayer capacitor shown in FIG. 14.
Figure 16:
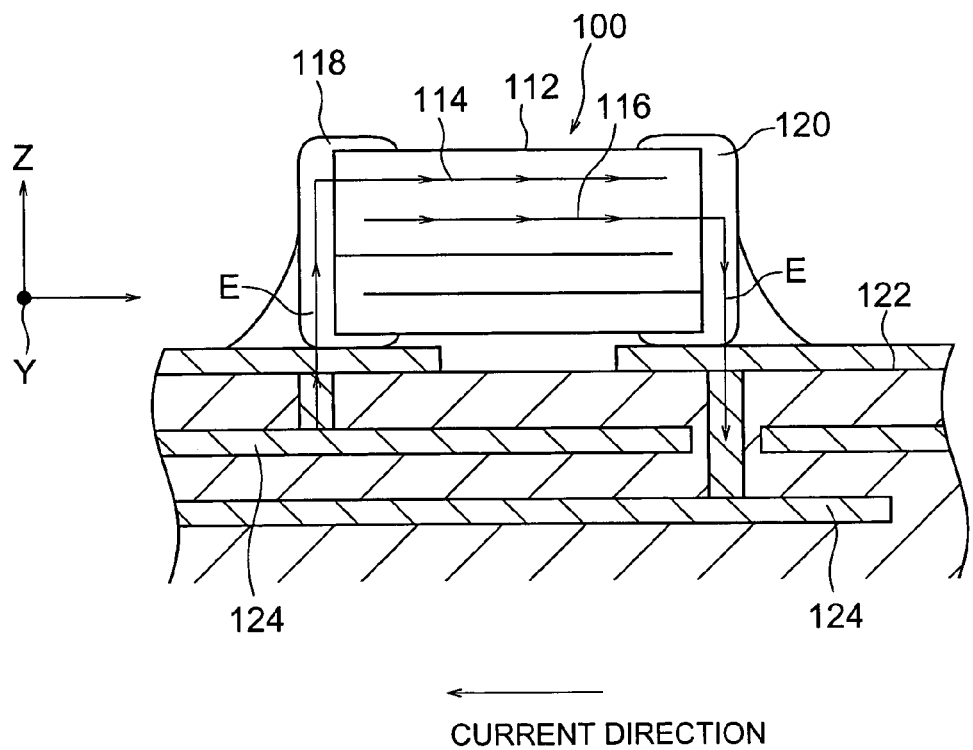
FIG. 16 is a sectional view of a first mounting structure of a multilayer capacitor according to the related art.
Figure 17:
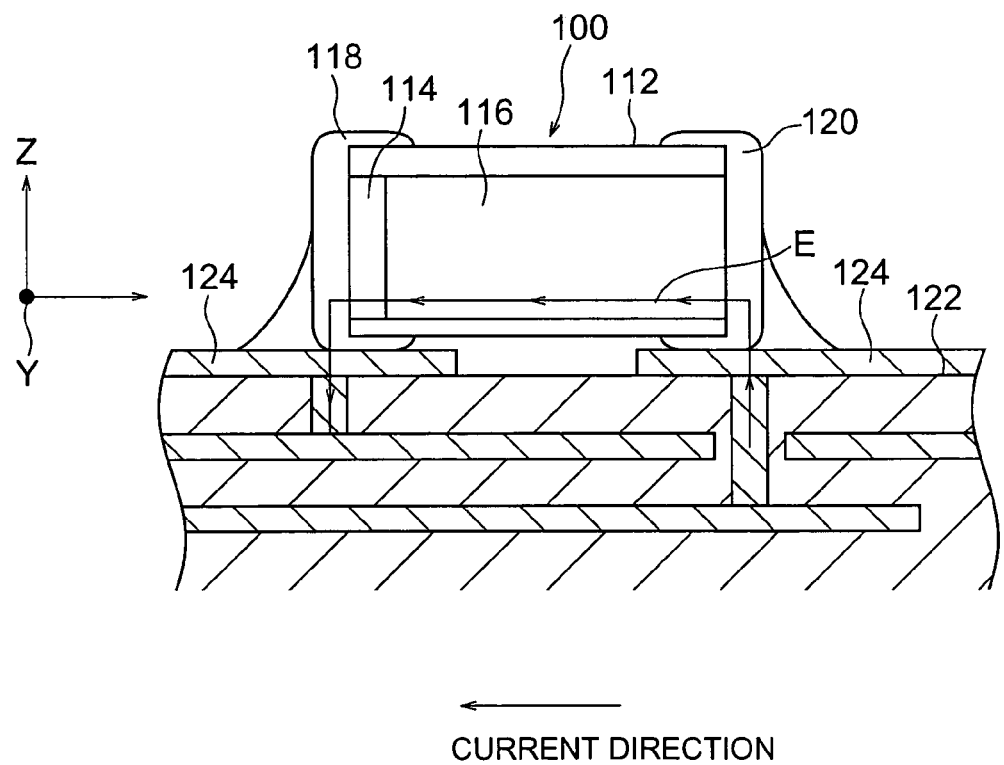
FIG. 17 is a sectional view of a second mounting structure of a multilayer capacitor according to the related art.

Here, relating to the dimensions of the samples used, as shown in FIG. 14 and FIG. 1, the length W and the length W were, in both the comparative example and example of the invention, W=3.2 mm, L=2.5 mm, and T=2.5 mm. Further, the electrostatic capacities of the samples used for the tests were 10.03 μF for the comparative example and 9.25 μF for the example of the invention.

Note that the present invention is not limited to the above embodiments and can be modified in various ways within the scope of the invention. For example, the multilayer capacitor 10 according to the above embodiments was structured having two types of internal conductor layers, but the number of layers is not limited to the numbers shown in the embodiments and may be made greater numbers as well.

According to the present invention, it becomes possible to provide a multilayer capacitor capable of greatly reducing the effective inductance and reducing the voltage fluctuations of the CPU power source.

What is claimed is:

1. A multilayer capacitor, comprising:
a dielectric layer and
two types of first and second internal conductor layers insulated from each other by said dielectric layer and alternately arranged in a dielectric body,
said multilayer capacitor characterized in that
the first internal conductor layer is formed with at least one first cut part,
the second internal conductor layer is formed with at least one second cut part,
due to said cut parts, each internal conductor layer is formed with at least two channel parts connected at an uncut end in the same plane and the channel parts adjoining each other in the same plane carry current flowing in the reverse directions,
the first conductor layer is formed with a first lead part and the second conductor layer is formed with a second lead part at a position different from said first lead part so that current flows in reverse directions between the channel parts formed at the first and second internal conductor layers adjoining each other across the dielectric layer, and all of the lead parts of said capacitor are formed so as to be led out to only one surface of said dielectric body.

2. The multilayer capacitor as set forth in claim 1, wherein said one surface of the dielectric body where said lead parts are led out to is formed with:
a first terminal electrode connected to said first lead parts and
a second terminal electrode insulated so as not to be directly connected with said first terminal electrode and connected to said second lead parts.

3. The multilayer capacitor as set forth in claim 2, wherein said dielectric body is a rectangular parallelepiped,
a length of a side of said dielectric body running along the stacking direction of said dielectric layers is made longer than a length of any other two sides running along a direction intersecting the side running along the stacking direction, and
said one surface of said dielectric body is formed with said first terminal electrode and second terminal electrode.

4. The multilayer capacitor as set forth in claim 3, wherein said one surface of said dielectric body is formed with said first terminal electrode and second terminal electrode so as to extend along said stacking direction substantially in parallel at a predetermined interval.

5. The multilayer capacitor as set forth in claim 4, wherein the first lead part is formed near one first end in the longitudinal direction of said dielectric layer, and the second lead part is formed near another second end in the longitudinal direction of said dielectric layer.

6. The multilayer capacitor as set forth in claim 1, wherein the first and second cut parts for forming the channel parts in the first and second internal conductor layers adjoining each other across the dielectric layer are formed at substantially the same positions between the internal conductor layers adjoining each other.

7. The multilayer capacitor as set forth in claim 1, wherein
a starting point of the first cut part formed in the first internal conductor layer starts from near the first lead part of said first internal conductor layer,
a starting point of the second cut part formed in the second internal conductor layer starts from near the second lead part of said second internal conductor layer, and
these cut parts are formed at substantially the same positions between the internal conductor layers adjoining each other.

8. The multilayer capacitor as set forth in claim 7, wherein the first cut part formed at the first internal conductor layer is substantially L-shaped,
the second cut part formed at the second internal conductor layer is a linear shape running through a substantial center of the dielectric layer along a longitudinal direction of said dielectric layer, and
said first cut part and said second cut part are formed at substantially the same positions across said dielectric layer.

9. The multilayer capacitor as set forth in claim 1, wherein the first internal conductor layer is formed with a plurality of first cut parts,
the second internal conductor layer is formed with a plurality of second cut parts at positions corresponding to said first cut parts, and
uncut ends of corresponding cut parts across the dielectric layer are formed at opposite sides along the longitudinal direction of said cut parts.

10. The multilayer capacitor as set forth in claim 9, wherein said first and second cut parts are formed in the internal conductor layers to be alternately opposite in substantially perpendicular direction with respect to the longitudinal direction of said dielectric layer.

11. The multilayer capacitor as set forth in claim 9, wherein said first and second cut parts are formed in the internal conductor layers to be alternately opposite in direction of inclination with respect to the longitudinal direction of said dielectric layer.

12. The multilayer capacitor as set forth in claim 1, wherein the width of said uncut ends is substantially equal to the width of said channels.

13. The multilayer capacitor as set forth in claim 1, wherein the width of said cut parts is 100 to 200 μm.

14. The multilayer capacitor as set forth in claim 1, wherein
one of the channel parts formed by the first cut part is extended to form the first lead part and
one of the channel parts formed by the second cut part is extended to form the second lead part.

15. The multilayer capacitor as set forth in claim 1, wherein
the first lead part is led out to a first side surface of said dielectric body, and
the second lead part is led out to another second side surface of said dielectric body facing said first side surface.

16. The multilayer capacitor as set forth in claim 15, wherein
said first side surface is formed with a first terminal electrode connected to the first lead part of said first internal conductor layer, and
said second side surface is formed with a second terminal electrode connected to the second lead part of said second internal conductor layer.

17. The multilayer capacitor as set forth in claim 16, wherein
said dielectric body is a rectangular parallelepiped,
a length of a side of said dielectric body running along a stacking direction of said dielectric layers is made longer than a length of any other two sides running along a direction intersecting the side running along the stacking direction, and
opposite side surfaces of said dielectric body are formed with said first terminal electrode and second terminal electrode.

18. The multilayer capacitor as set forth in claim 15, wherein the first and second cut parts for forming the channel parts of the first and second internal conductor layers adjoining each other across the dielectric layer are formed at substantially the same positions between the adjoining internal conductor layers.

19. The multilayer capacitor as set forth in claim 18, wherein
a starting point of the first cut part formed in the first internal conductor layer starts from near the first lead part of said first internal conductor layer,
a starting point of the second cut part formed in the second internal conductor layer starts from near the second lead part of said second internal conductor layer, and
these cut parts are formed at substantially the same positions between the adjoining internal conductor layers.

20. The multilayer capacitor as set forth in claim 19, wherein said first and second cut parts are formed running through a center part of each internal conductor layer along a longitudinal direction of each internal conductor layer and the uncut ends of the cut parts are arranged alternately opposite from each other via the dielectric layer.

21. The multilayer capacitor as set forth in claim 15, wherein one of the channel parts formed by said first cut part is extended so as to form the first lead part and
one of the channel parts formed by said second cut part is extended to form the second lead part.

22. The multilayer capacitor as set forth in claim 21, wherein a width of said channel parts and a width of said first and second lead parts are substantially the same.

23. The multilayer capacitor as set forth in claim 21, wherein a width of said first and second lead parts is larger than a width of said channel parts.

24. The multilayer capacitor as set forth in claim 15, wherein said first and second cut parts are formed in the internal conductor layers to be alternately opposite in substantially perpendicular direction with respect to the longitudinal direction of said dielectric layer.

25. The multilayer capacitor as set forth in claim 15, wherein said first and second cut parts are formed in the internal conductor layers to be alternately opposite in longitudinal direction of said dielectric layer.

26. The multilayer capacitor as set forth in claim 15, wherein said first and second cut parts are formed in the internal conductor layers to be alternately opposite in direction of inclination with respect to the longitudinal direction of said dielectric layer.

27. The multilayer capacitor as set forth in claim 15, wherein a width of said uncut ends is substantially equal to a width of said channels.

28. The multilayer capacitor as set forth in claim 15, wherein a width of said cut parts is 100 to 200 μm.

29. A multilayer capacitor, comprising:
a dielectric layer; and
two types of, that is, first and second, internal conductor layers insulated from each other by said dielectric layer and alternately arranged in a dielectric body each of said internal conductor layers having a lead part,
said multilayer capacitor characterized in that
the first internal conductor layer is formed with at least one first cut part,
the second internal conductor layer is formed with at least one second cut part,
due to said cut parts, each internal conductor layer is formed with at least two channel parts connected at an uncut end in the same plane and the channel parts adjoining each other in the same plane carry current flowing in the reverse directions, wherein
the first internal conductor layer is formed with a plurality of first cut parts,
the second internal conductor layer is formed with a plurality of second cut parts at positions corresponding to said first cut parts, and
uncut ends of corresponding cut parts across the dielectric layer are formed at opposite sides along the longitudinal direction of said cut parts, and all of the lead parts of said capacitor are formed so as to be led out to only one surface of said dielectric body.

30. The multilayer capacitor as set forth in claim 29, wherein said first and second cut parts are formed in the internal conductor layers to be alternately opposite in substantially perpendicular direction with respect to the longitudinal direction of said dielectric layer.

31. The multilayer capacitor as set forth in claim 29, wherein said first and second cut parts are formed in the internal conductor layers to be alternately opposite in direction of inclination with respect to the longitudinal direction of said dielectric layer.

* * * * *